United States Patent
Banzhaf

(10) Patent No.: US 11,243,330 B2
(45) Date of Patent: Feb. 8, 2022

(54) METHOD AND DEVICE FOR DETECTING COLLISIONS FOR A VEHICLE

(71) Applicant: Robert Bosch GmbH, Stuttgart (DE)

(72) Inventor: Holger Andreas Banzhaf, Laichingen (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 16/642,625

(22) PCT Filed: Aug. 8, 2018

(86) PCT No.: PCT/EP2018/071508
§ 371 (c)(1),
(2) Date: Feb. 27, 2020

(87) PCT Pub. No.: WO2019/048169
PCT Pub. Date: Mar. 14, 2019

(65) Prior Publication Data
US 2020/0348442 A1 Nov. 5, 2020

(30) Foreign Application Priority Data
Sep. 5, 2017 (DE) .......................... 102017215519.1

(51) Int. Cl.
*B60W 30/095* (2012.01)
*G01V 11/00* (2006.01)

(52) U.S. Cl.
CPC ....... *G01V 11/002* (2013.01); *B60W 30/0956* (2013.01)

(58) Field of Classification Search
CPC ............ G01V 11/002; B60W 30/0956; B60W 2554/00; B60W 30/0953; G08G 1/168; G08G 1/165; G08G 1/166
See application file for complete search history.

(56) References Cited

U.S. PATENT DOCUMENTS

| | | | |
|---|---|---|---|
| 6,370,475 B1 * | 4/2002 | Breed .................... | G01S 13/931 701/301 |
| 6,452,533 B1 * | 9/2002 | Yamabuchi ........... | G01S 13/931 342/70 |
| 2005/0060069 A1 * | 3/2005 | Breed .................... | G08G 1/164 701/408 |

(Continued)

FOREIGN PATENT DOCUMENTS

| CN | 102576075 A | 7/2012 |
|---|---|---|
| DE | 69626154 T2 | 6/2003 |

(Continued)

OTHER PUBLICATIONS

International Search Report for PCT/EP2018/071508, dated Dec. 4, 2018.

*Primary Examiner* — Mischita L Henson
(74) *Attorney, Agent, or Firm* — Norton Rose Fulbright US LLP; Gerard Messina

(57) ABSTRACT

A method and a device for detecting collisions for a vehicle. In this context, an at least three-stage method is described. A first collision check, a second collision check, and a third collision check are performed. Surface areas are considered step-by-step along a section of a trajectory of the vehicle. In the individual steps, the surface areas in the individual steps being approximated to the actual swath of the vehicle.

13 Claims, 3 Drawing Sheets

(56) References Cited

U.S. PATENT DOCUMENTS

| | | | | |
|---|---|---|---|---|
| 2011/0295576 A1* | 12/2011 | Miyata | ................... | B25J 9/1676 |
| | | | | 703/2 |
| 2012/0296523 A1 | 11/2012 | Ikeda et al. | | |
| 2015/0142299 A1* | 5/2015 | Shin | ........................ | G06T 11/20 |
| | | | | 701/301 |
| 2021/0166564 A1* | 6/2021 | Takaki | ................... | G08G 1/167 |

FOREIGN PATENT DOCUMENTS

| | | |
|---|---|---|
| DE | 102007055389 A1 | 5/2009 |
| EP | 1366867 A2 | 12/2003 |
| EP | 1672450 A1 | 6/2006 |
| GB | 2486814 A | 6/2012 |
| WO | 2016150590 A1 | 9/2016 |

\* cited by examiner

METHOD AND DEVICE FOR DETECTING COLLISIONS FOR A VEHICLE

FIELD

The present invention relates to a method and a device for detecting collisions for a vehicle.

BACKGROUND INFORMATION

Maneuvering vehicles in close scenarios plays an important role especially when parking vehicles. The difficulty first lies in generating a collision-free trajectory that includes as few as possible changes in direction and minimal curvature changes over the course of the trajectory. To this end, geometric methods are mostly used.

In the near future, high-density parking will be used for automated vehicles, i.e., the vehicles will be parked more closely together and possibly in a way that will require displacement operations to move a further vehicle out of a parking space. Resulting therefrom are highly non-convex state spaces within which a trajectory must be found for maneuvering the vehicle. Moreover, in such scenarios, the exact contour of the vehicle must be included in the planning, and it is not possible to refer merely to rectangular bounding boxes or circles on the contour to actually be able to find a trajectory of adequate quality that includes few changes of direction.

Rapidly exploring random trees, referred to in the following as "RRT," provide one possible approach for overcoming this path planning difficulty. An RRT randomly generates two configurations in the state space and connects them exactly using what is commonly known as a "steering function." If the connected path is collision-free, is added to a tree (graph). As a result, there is no need to discretize the state space, and it is probabilistically converged to achieve the optimum approach, if one exists. Such an RRT spends approximately 90% of the computing time thereof executing collision checks. A most efficient and fastest possible collision detection is, therefore, especially important.

SUMMARY

An example collision detection method according to the present invention for a vehicle includes performing a first collision check, it being checked whether an object from a surrounding area of the vehicle resides within an enveloping surface, the enveloping surface extending along a section of a trajectory of the vehicle, the enveloping surface having a defined first geometric shape, which is selected with the aim of having the vehicle remain within the enveloping surface when driven on the section of the trajectory, performing a second collision check in the case that the first collision check determined that an object from the surrounding area of the vehicle resides within the enveloping surface, the second collision check examining whether an object resides in a partial surface associated with the enveloping surface that defines a subarea of the enveloping surface and has a defined second geometric shape that is selected and located within the enveloping surface with the aim of having each point of the partial surface be traversed by the vehicle when the section of the trajectory is driven on, and a third collision check being performed in the case that the second collision check determines that there is no object from the surrounding area of the vehicle residing within the partial surface, it being checked whether an object lies on those points within the enveloping surface which are traversed by the vehicle when the section of the trajectory is driven on.

The example collision detection device for a vehicle is adapted for performing the method according to the present invention.

A trajectory is thereby a path of movement provided by a planning algorithm. The trajectory is thereby preferably one possible trajectory from a multiplicity of trajectories, a trajectory being selected as the final trajectory when the collision detection determines that there will be no collision between the vehicle and an object on this trajectory. The trajectory is divided into individual sections, or merely includes one single section. If the trajectory includes a plurality of sections, it is then considered, in particular on a section-by-section basis.

The first collision check examines whether an object from the surrounding area of the vehicle resides within an enveloping surface. Thus, the first collision check makes a rough estimate as to whether a collision between the vehicle and an object is likely to occur. In particular, the first geometric shape is one that is selected independently of an outer contour of the vehicle. The enveloping surface is thereby selected to both have points lie therein, which are traversed by the vehicle when the section is driven on, as well as those points where no collision would occur between the vehicle and an object, if the object were to be located on one of these points. The first geometric shape is thereby preferably associated with a path shape of the section of the trajectory of the vehicle. The enveloping surface extends along the section of the trajectory of the vehicle. This means that the configuration of the enveloping surface is dependent on the trajectory, respectively the section thereof.

A geometric model is typically used to perform the collision detection method according to the present invention. This means that the enveloping surfaces, the trajectory, and the subareas are merely described as mathematical constructs. A configuration of the enveloping surface, of the trajectory and of the partial surface are correlated to an actual surrounding area of a vehicle, in order to plan the trajectory in this actual surrounding area.

A second collision check is also carried out in the case that the first collision check determines that an object from the surrounding area of the vehicle lies within the enveloping surface. The second collision check is performed in response to a result from the first collision check. If the first collision check determines that no object from the surrounding area of the vehicle lies within the enveloping surface, the third collision check may be skipped upon execution of the second collision check since a collision between the vehicle and an object may already be ruled out at this point in time. The second collision check examines whether an object is located in such an area of the enveloping surface that will certainly be traversed by the vehicle, thus, where a collision between the vehicle and the object would certainly occur. The partial surface is thereby selected to have a second geometric shape. The second defined geometric shape is thereby independent of a contour of the vehicle. In addition, a surface of the partial surface is smaller than the surface of the area the vehicle traverses when it is driven on the section of the trajectory. Thus, in an approximation, the second collision check estimates whether a collision between the vehicle and an object would occur with certainty if the vehicle were to be driven on the section. However, there is still the option of a collision occurring even if the second collision check determines that no object lies within the partial surface. The description that the vehicle traverses an area means that, at any point in time, any point of the vehicle is situated at a point of this area during movement along the section of the trajectory.

Moreover, a third collision check is performed if the second collision check determines that there is no object from the surrounding area of the vehicle within the partial surface. If the second collision check already determined that an object from the surrounding area of the vehicle lies within the partial surface, then execution of the third collision check may be skipped since the occurrence of a collision was already detected. Upon execution of the third collision check, it is examined on the basis of the contour of the vehicle whether a collision will occur between the vehicle and an object when the vehicle moves along the section. Thus, details from the contour of the vehicle are considered for the first time during the third collision check. Reference to a convex contour of the vehicle, which is an approximation of an actual contour thereof. Thus, for example, all points are explicitly computed that are traversed by any point of the vehicle when it moves along the section of the trajectory. For that purpose, reference is preferably made to a vehicle model, which describes the outer contour of the vehicle. The areas, already defined by the partial surface, are optionally not thereby further considered.

Thus, in accordance with the present invention, a method and a device for detecting collisions for a vehicle are provided, an entire swath of the vehicle being continuously checked for collision. The need is thereby eliminated for discretizing the path, thus the trajectory, and for the repeated discreet checking of individual configurations for collision. Thus, a method is provided which requires very little computing time and only minor computational resources. Thus, in the case of an RRT, a computing speed may be nearly doubled.

Preferred embodiments of the present invention are described herein.

It is advantageous when, upon execution of the first collision check, the first geometric shape is selected as a ring segment in the case that the section of the trajectory describes a curve. A ring segment is a geometric surface that is simple to define. Thus, the first collision check may be performed on the basis of simple mathematical equations. At the same time, if the trajectory describes a curve, the ring segment effectively approximates such an area in which a collision would actually occur between the vehicle and an object. In this way, a probability of the first collision check determining that an object from the surrounding area of the vehicle lies within the enveloping surface is kept especially low. This prevents the second collision check and the third collision check from being performed unnecessarily. An especially efficient method is, therefore, provided.

During execution of the first collision check, it is also advantageous for the first geometric shape to be selected as a rectangle in the case that the section of the trajectory describes a straight line. A rectangle is a geometric surface that is simple to define. Thus, the first collision check may be performed on the basis of simple mathematical equations. At the same time, if the trajectory describes a curve, the rectangle effectively approximates such an area in which a collision would actually occur between the vehicle and an object. In this way, a probability of the first collision check determining that an object from the surrounding area of the vehicle lies within the enveloping surface is kept especially low. This prevents the second collision check and the third collision check from being performed unnecessarily. An especially efficient method is, therefore, provided.

It is advantageous when, upon execution of the second collision check, the second geometric shape is selected as a ring segment in the case that the section of the trajectory describes a curve. The ring segment is a shape that is mathematically simple to describe. At the same time, the ring segment effectively approximates the surface that the vehicle actually traverses when it is driven on the section, in particular in the case of a maximum steering angle. In this way, a probability is kept especially low of the second collision check determining that there is no object from the surrounding area of the vehicle within the partial surface, although the location of an object connotes that a collision with the vehicle would occur if the vehicle were to be driven on the section. This prevents the third collision check from being performed unnecessarily.

During execution of the second collision check, it is also advantageous for the second geometric shape to be selected as a rectangle in the case that the section of the trajectory describes a straight line. The rectangle is a shape that is mathematically simple to describe. At the same time, the rectangle effectively approximates the surface that the vehicle actually traverses when it is driven on the section. In this way, a probability is kept low of the second collision check determining that no object from the surrounding area of the vehicle lies within the partial surface, although the location of an object connotes that a collision with the vehicle would occur if the vehicle were to be driven on the section. This prevents the third collision check from being performed unnecessarily.

It is also advantageous when, upon execution of the second collision check, it is examined whether an object resides in one of a plurality of partial surfaces associated with the enveloping surface, each of the plurality of partial surfaces defining a subarea of the enveloping surface, respectively, and having a defined second geometric shape that is located in each case within the enveloping surface; each point of the plurality of partial surfaces being traversed by the vehicle when the section of the trajectory is driven on. In this manner, a plurality of simple geometric shapes may approximate a surface that the vehicle actually traverses when it is driven on the section. This increases the probability of the second collision check already correctly detecting whether a collision will occur between the vehicle and an object.

It is also advantageous for the second geometric shape to be identical for the plurality of partial surfaces, at least in the basic shape thereof, preferably also in the dimensions thereof. Two partial surfaces are identical in the basic shape thereof when one of the partial surfaces is able to be transformed into the other partial surface by a scaling along one or two axes. The dimensions refer to a size of the partial surfaces, in particular also a size described by a surface area of the partial surfaces. Thus, identical formulas may be used for the second collision check, making possible an especially rapid computation in the second collision check.

It is also advantageous when the trajectory is composed of a plurality of sections. Thus, a complex trajectory may be described by combining different sections. Thus, a collision detection is carried out for complex trajectories, a computational outlay being kept to a minimum.

It is also advantageous when the first collision check is initially performed, then the second collision check, and then the third collision check for all of the relatively near sections until a collision is detected in one of the second or third collision checks. The second and third collision checks are performed in response to no collision being detected in any of the first collision checks. Thus, the first collision check is initially performed for all sections of the trajectory. If no collision is detected, the second collision check is then carried out for the sections. If a collision is already thereby detected, this eliminates the need for the third collision check, respectively for the remaining second collision checks. If all of the second collision checks were performed without a collision being detected, the third collision checks are executed.

As soon as a collision is detected, the remaining third collision checks are omitted. Thus, an especially fast algorithm is provided for checking a trajectory for a collision.

The device according to the present invention has all of the advantages of the method according to the present invention.

BRIEF DESCRIPTION OF THE DRAWINGS

Exemplary embodiments of the present invention are described in detail in below with reference to the figures.

DETAILED DESCRIPTION OF EXAMPLE EMBODIMENTS

Figure 1:
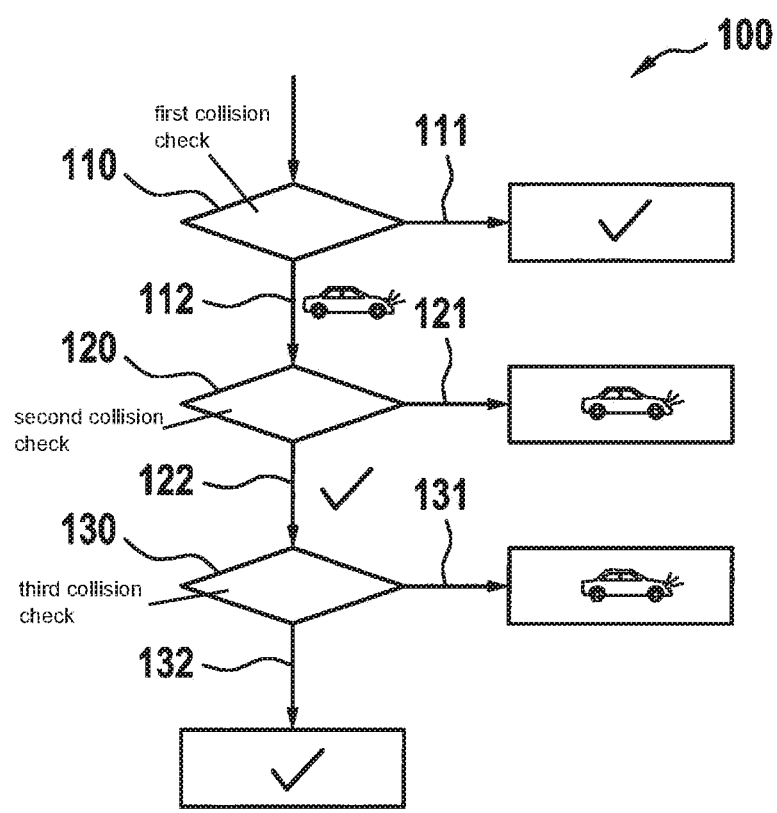
FIG. 1 shows a flow chart of the method according to the present invention in accordance with a first specific embodiment.

FIG. 1 shows a flow chart 100 illustrating an example method for detecting collisions for a vehicle 2 in a first specific embodiment of the present invention. In this first specific embodiment, the method is a three-stage method, in which a first collision check 110, a second collision check 120, and a third collision check 130 are performed.

The method is a step-by-step collision detection. This means that, under certain circumstances, a collision may already be ruled out once first collision check 110 is performed. Furthermore, once second collision check 120 is performed, a collision may already be determined with certainty in the case that the object, with which the collision would occur, is situated accordingly relative to the trajectory. Only in those cases where first collision check 110 and second collision check 120 do not yield a certain result is third collision check 130 performed to examine borderline cases.

Figure 4:
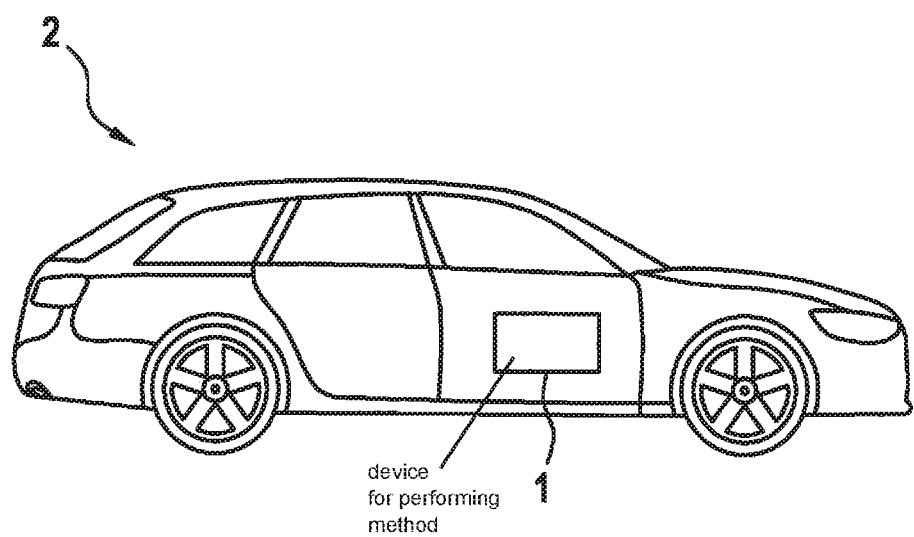
FIG. 4 exemplarily shows a vehicle which includes the device according to the present invention.

The method begins with the execution of first collision check 110. The method is performed by a device 1 located in vehicle 2. A vehicle 2 of this kind that includes device 1 according to the present invention is shown exemplarily in FIG. 4.

First collision check 110 examines whether an object from the surrounding area of vehicle 2 resides within an enveloping surface 10, enveloping surface 10 extending along a section 11 of a trajectory of vehicle 2, enveloping surface 10 having a defined first geometric shape, which is selected with the aim of having vehicle 2 remain within enveloping surface 10 when section 11 of the trajectory is driven on.

Figure 2:
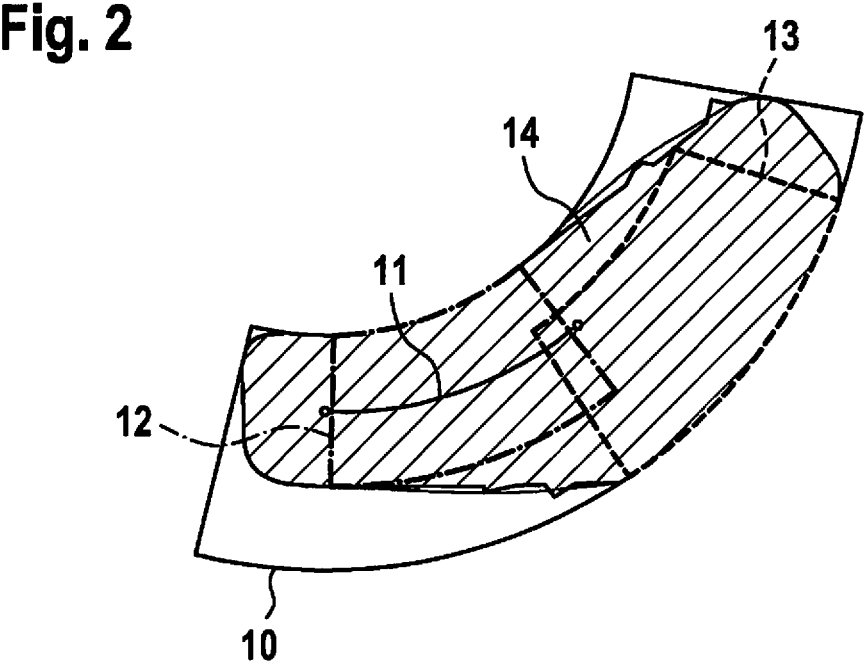
FIG. 2 exemplarily shows surface areas, which are considered in a collision detection according to the present invention for a curved section of the trajectory.

Reference is made to FIG. 2, in which section 11 of the trajectory is selected exemplarily as a curve having a constant radius. This means that a defined point of vehicle 2 would move along section 11 if vehicle 2 were moved along the trajectory. In response to section 11 of the trajectory being a constant radius curve, the first geometric shape was selected as a ring segment. In this instance, the ring segment and curved section 11 of the trajectory have a same center point. Thus, upon execution of first collision check 110 in the example shown in FIG. 2, the first geometric shape of enveloping surface 10 is selected as a ring segment since section 11 of the trajectory describes a curve.

In the example provided in FIG. 2, vehicle 2 is moved from right to left along curved section 11 of the trajectory. In the process, vehicle 2 traverses changing points in the surrounding area of vehicle 2. The sum of all points traversed by vehicle 2 if it moves over section 11 is referred to here as envelope 14 and is also shown in FIG. 2. This means that any object located within envelope 14 would lead to a collision with vehicle 2 if vehicle 2 were to be driven on curved section 11 of the trajectory. The first geometric shape is selected with the aim of having envelope 14 lie completely within enveloping surface 10.

Thus, in the example illustrated in FIG. 2, first collision check 110 examines whether an object lies within enveloping surface 10 which has the shape of a ring segment. It is likewise apparent from FIG. 2 that areas are also present in the ring segment, thus within enveloping surface 10, which are not traversed by vehicle 2 when it moves along section 11. Thus, a surface of enveloping surface 10 is larger than a surface of envelope 14. Thus, a situation may arise where an object lies within enveloping surface 10, but a collision with vehicle 2 nevertheless does not occur.

First collision check 110 examines whether an object from the surrounding area of vehicle 2 resides within enveloping surface 10. If it is ascertained that no object resides within enveloping surface 10, then, under no circumstances, can there be a collision between vehicle 2 and an object if vehicle 2 were to be driven on section 11. In this case, the inventive method is ended, and the result output is that no collision of vehicle 2 with an object occurs if the vehicle were to be driven on section 11. Branch 111 represents this in FIG. 1. The check mark is thereby understood to mean that no collision is expected for section 11.

However, if it is recognized that an object is located within enveloping surface 10, then a collision between the vehicle and the object may not be ruled out. A further check is, therefore, needed and, for that reason, second collision check 120 is performed. Branch 112 illustrates this in FIG. 1.

In the example embodiment, second collision check 120, which is always executed when first collision check 110 determines that an object from the surrounding area of vehicle 2 resides within enveloping surface 10, examines whether an object resides in a partial surface associated with enveloping surface 10. Associated partial surface 12 defines a subarea of enveloping surface 10 and has a defined second geometric shape, which is selected and configured within enveloping surface 10, with the aim of each point of partial surface 12 being traversed by vehicle 2 when section 11 of the trajectory is driven on. Thus, partial surface 12 lies completely within envelope 14.

FIG. 2 shows a first associated partial surface 12 and a second associated partial surface 13. Both associated partial surfaces 12, 13 reside within envelope 14. In response to section 11 of the trajectory describing a curve in the example shown in FIG. 2, the second geometric shape of first and second partial surface 12, 13 was selected as a ring segment. Thus, first and second partial surface 12, 13 have an identical basic shape. However, second partial surface 13 is larger than first partial surface 12, which is why they differ in the dimensions thereof.

Since partial surfaces 12, 13 lie completely within envelope 14, it may be assumed that a collision will certainly occur between vehicle 2 and an object if an object is located within partial surfaces 12, 13.

Since partial surfaces 12, 13 lie within envelope 14, they likewise reside within enveloping surface 10. Thus, each of partial surfaces 12, 13 forms a subarea of enveloping surface 10. Since partial surfaces 12, 13 lie completely within first envelope 14, it is also ensured that each of the points of partial surfaces 12, 13 is traversed by vehicle 2 when section 11 of the trajectory is driven on.

If it is determined that an object resides within one of partial surfaces 12, 13, it may be assumed that a collision will certainly occur between vehicle 2 and the object if vehicle 2 were moved along section 11 of the trajectory. Thus, as a result of the collision detection, it may be output that a collision is at hand. Branch 121 represents this in FIG. 1. However, an object may also be situated outside of partial surfaces 12, 13, but within envelope 14. In such a case, a collision between vehicle 2 and the object would occur if the vehicle were to be driven on section 11 of the trajectory. However, the object could also lie outside of envelope 14, but within enveloping surface 10, which would result in no collision occurring between vehicle 2 and the object. For that reason, third collision check 130 is performed if second collision check 120 determines that no object from the surrounding area of vehicle 2 lies within partial surface 12. Branch 122 illustrates this in FIG. 1.

Third collision check 130 examines whether an object lies on those points of (auxiliary surface) envelope 14 within enveloping surfaces 10 that are traversed by vehicle 2 when the section of the trajectory is driven on. Therefore, an algorithm is executed, which, on the basis of a vehicle model, determines whether a collision will occur between vehicle 2 and an object when the vehicle is moved along section 11. To this end, conventional algorithms may be used where envelope 14 is precisely computed. As an example of such an algorithm, reference is made to the method for computing a distance between complex objects in three-dimensional space by Gilbert, Johnson and Keerthi, also referred to as GJK. In this first specific embodiment, the algorithm executed in third collision check 130 is selected to also be able to execute the collision detection independently. However, this complex algorithm is only executed when first collision check 110 and second collision check 120 yield a result indicative thereof. This means that the complex algorithm is not always executed, whereby the collision detection method is appreciably accelerated.

As is also illustrated exemplarily in FIG. 2, executing third collision check 130 signifies that it is precisely examined whether the object is located within envelope 14. The need may be optionally eliminated in such a check for examining partial surfaces 12, 13 once more for a collision. Thus, it is optionally only checked whether the object resides in an area of envelope 14 that is outside of partial surfaces 12, 13. If an object is located within envelope 14, it is ascertained that a collision is at hand. Branch 131 illustrates this in FIG. 1. If no object is located within envelope 14, it is determined that no collision will occur. Branch 132 illustrates this in FIG. 1.

In the example illustrated in FIG. 2, vehicle 2 moves to the left with a constant steering angle and starts with a 0° heading angle. Envelope 14 represents the actual swath of a vehicle contour of vehicle 2 during this maneuver (including the wheels and the mirror). As is also readily apparent in FIG. 2, large portions of the swath may be covered by what are commonly known as "donut areas," previously referred to as ring segments, which form partial surfaces 12, 13. The advantage of donut areas is that collisions with other objects may be readily and very rapidly checked (point in donut arc or line intersects the donut arc).

Figure 3:
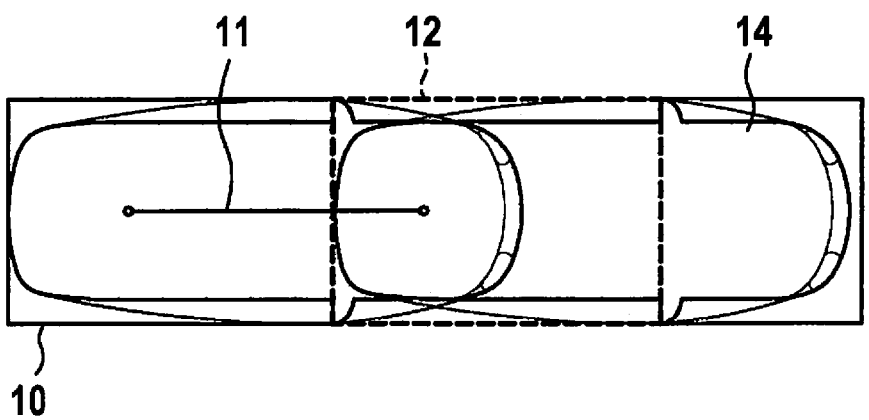
FIG. 3 exemplarily shows surface areas, which are considered in a collision detection according to the present invention for a straight section of the trajectory.

In the previously described example, it was assumed that section 11 of the trajectory is a curve having a constant radius. With reference to FIG. 3, it is shown that section 11 of the trajectory may also be a straight line. Since a trajectory is typically composed of straight lines and curves, the first geometric shape of enveloping surface 10 is selected to be a rectangle in this first specific embodiment in response to section 11 of the trajectory describing a straight line. Accordingly, it is examined upon execution of first collision check 110 whether an object is located within the outer rectangle shown in FIG. 3 and thus within enveloping surface 10. If this is not the case, the determination is made that no collision is at hand for straight-shaped section 11 under consideration. If it is determined that an object is located within enveloping surface 10, second collision check 120 examines whether an object is situated within partial surface 12. Partial surface 12 features the second geometric shape, which, in response to section 11 of the trajectory describing a straight line, was selected as a rectangle. If the object is located within partial surface 12, a collision is determined. If the object is not located within partial surface 12, third collision check 130 is performed. Third collision check 130 corresponds to the collision check, which was also carried out for curved section 11, and it is examined whether an object is located within envelope 14, third collision check 130 optionally taking place only for those areas of envelope 14 situated outside of partial surface 12.

Thus, first through third collision checks 110, 120, 130 are performed for straight-shaped sections 11 and curved sections 11 correspondingly; different geometric shapes of enveloping surface 10 and of the one or plurality of partial surfaces 12, 13 being selected, however.

It is apparent that first through third collision checks 110, 120, 130 must be executed for each section of a trajectory. It is thereby advantageous when first collision check 110 is initially performed for all sections 11 of the trajectory. If a potential collision is not determined for any of sections 11, thus, if there is no object in any of enveloping surfaces 10 that are derived for individual sections 11, it may be assumed with certainty that no collision will occur on the entire trajectory, and the method may be ended since it is certain that no collision is at hand for the trajectory.

If it is not possible to rule out a collision for one or a plurality of sections 11 on the trajectory since the object lies within enveloping surface 10, second collision check 120 is performed for sections 11 of the trajectory. If a collision is thereby determined, the method is ended since it is certain that a collision is at hand for the trajectory. In the process, it is not necessary to execute second collision check 120 for all sections 11 of the trajectory, if a collision is detected before second collision check 120 has been executed for all sections 11.

If second collision check 120 determines that there is no collision, third collision check 130 is then executed for sections 11 of the trajectory, until either a collision is determined or third collision check 130 has examined all of sections 11, and no collision was thereby determined.

Thus, the method according to the present invention provides a continuous collision check, which essentially proceeds as follows in the case of a curve:

1. Take the enveloping donut arc and place it around the entire swath, thus enveloping surface 10, and check whether the donut arc is collision-free. If collision-free, continue, otherwise:

2. Check whether the inner donut areas, thus, partial surfaces 12, 13, would collide with an object in the surrounding area, if yes → collision found, otherwise:

3. Use a discrete collision checker, such as the GJK, to examine whether the convex envelope around the initial configuration and the final configuration would collide. If yes → collision found, otherwise:

4. Use the discrete collision checker to examine whether the convex envelope around the protruding wheels in the initial and final configuration would collide. If yes, collision found, otherwise no collision.

A vehicle's swath having contour precision is as follows in the case of the movement on a straight line:

1. Use the discrete collision checker to examine the enveloping box, thus, enveloping surface 10, for collision. If collision-free, continue, otherwise:

2. Use the discrete collision checker to examine enveloping surface 12 in the center of the swath. If collision-free, proceed to 3., otherwise collision.

3. Use the discrete collision checker to examine the initial configuration and final configuration for collision; if collision-free → there is no collision with the swath.

In addition to the above description, reference is explicitly made to the disclosure of FIG. 1 through 4.

What is claimed is:

1. A method for detecting collisions for a vehicle, comprising the following steps:
executing a first collision check, the first collision check including checking whether an object from a surrounding area of the vehicle resides within an enveloping surface, the enveloping surface extending along a section of a trajectory of vehicle, the enveloping surface having a defined first geometric shape such that the vehicle remains within the enveloping surface when the section of the trajectory is driven on;
responsive to the first collision check determining that an object from the area resides with the enveloping surface, executing a second collision check, the second collision check including examining whether an object is located in a partial surface associated with the enveloping surface, the partial surface defining a subarea of the enveloping surface and has a specified second geometric shape, which is within the enveloping surface, and each point of the partial surface being traversed by the vehicle when the section of the trajectory is driven on; and
responsive to the second collision check determining that there is no object from the surrounding area of the vehicle within the partial surface, executing a third collision check, the third collision check including checking whether an object lies on points within the enveloping surface which are traversed by the vehicle when the section of the trajectory is driven on,
wherein the execution of the second collision check and the execution of the third collision check is skipped if it was determined in the first collision check that no object from the surrounding area of the vehicle resides within the enveloping surface, and
the execution of the third collision check is skipped if it was determined in the second collision check that the object from the surrounding area of the vehicle resides within the partial surface.

2. The method as recited in claim 1, wherein, upon execution of the first collision check, the first geometric shape is selected as a ring segment based on the section of the trajectory describing a curve.

3. The method as recited in claim 1, wherein, during execution of the first collision check, the first geometric shape is selected as a rectangle based on the section of the trajectory describing a straight line.

4. The method as recited in claim 1, wherein, upon execution of the second collision check, the second geometric shape is selected as a ring segment based on the section of the trajectory describing a curve.

5. The method as recited in claim 1, wherein, upon execution of the second collision check, the second geometric shape is selected as a rectangle based on the section of the trajectory describing a straight line.

6. The method as recited in claim 1, wherein the second collision check further includes examining whether an object is located in one of a plurality of the partial surfaces associated with the enveloping surface, each of the plurality of partial surfaces defining a subarea of the enveloping surface, respectively, and having a defined second geometric shape that is located within the enveloping surface, respectively, each point of the plurality of partial surfaces being traversed by the vehicle when the section of the trajectory is driven on.

7. The method as recited in claim 1, wherein the second geometric shape is identical for the plurality of partial surfaces, at least in terms of basic shape.

8. The method as recited in claim 7, wherein the second geometric shape is identical of the plurality of partial surfaces also in terms of dimensions.

9. The method as recited in claim 1, wherein the trajectory is composed of a plurality of sections.

10. The method as recited in claim 9, wherein the first collision check is initially performed, then the second collision check, and then the third collision check, for all of the plurality of sections until a collision is recognized in one of the second collision check or the third collision check.

11. The method as recited in claim 1, wherein the section of the trajectory is a curve having a constant radius, and the first geometric shape is a ring segment, wherein the ring segment and the curved section have a same center point.

12. A device for detecting collisions for a vehicle, the device configured to:
execute, by at least one processor, a first collision check, the first collision check including a check of whether an object from a surrounding area of the vehicle resides within an enveloping surface, the enveloping surface extending along a section of a trajectory of vehicle, the enveloping surface having a defined first geometric shape such that the vehicle remains within the enveloping surface when the section of the trajectory is driven on;
responsive to the first collision check determining, by the at least one processor, that an object from the area resides with the enveloping surface, execute, by the at least one processor, a second collision check, the second collision check including an examination of whether an object is located in a partial surface associated with the enveloping surface, the partial surface defining a subarea of the enveloping surface and has a specified second geometric shape, which is within the enveloping surface, and each point of the partial surface being traversed by the vehicle when the section of the trajectory is driven on; and responsive to the second collision check determining, by the at least one processor, that there is no object from the surrounding area of the vehicle within the partial surface, execute, by the at least one processor, a third collision check, the third collision check including a check of whether an object lies on points within the enveloping surface which are traversed by the vehicle when the section of the trajectory is driven on, wherein the execution of the second collision check and the execution of the third collision check is skipped if it was determined in the first collision check that no object from the surrounding area of the vehicle resides within the enveloping surface, and the execution of the third collision check is skipped if it was determined in the second collision check that the object from the surrounding area of the vehicle resides within the partial surface.

13. The device as recited in claim 12, wherein the section of the trajectory is a curve having a constant radius, and the first geometric shape is a ring segment, wherein the ring segment and the curved section have a same center point.

* * * * *